(12) United States Patent
Everhart et al.

(10) Patent No.: US 9,973,394 B2
(45) Date of Patent: May 15, 2018

(54) EVENTUAL CONSISTENCY AMONG MANY CLUSTERS INCLUDING ENTITIES IN A MASTER MEMBER REGIME

(71) Applicant: NETAPP, INC., Sunnyvale, CA (US)

(72) Inventors: Craig Everhart, Pittsburgh, PA (US); Steven Ewing, Pittsburgh, PA (US)

(73) Assignee: NetApp Inc., Sunnyvale, CA (US)

( * ) Notice: Subject to any disclaimer, the term of this patent is extended or adjusted under 35 U.S.C. 154(b) by 364 days.

(21) Appl. No.: 14/928,416

(22) Filed: Oct. 30, 2015

(65) Prior Publication Data

US 2017/0093983 A1    Mar. 30, 2017

Related U.S. Application Data

(60) Provisional application No. 62/234,742, filed on Sep. 30, 2015.

(51) Int. Cl.
*G06F 15/16* (2006.01)
*H04L 12/24* (2006.01)
*H04L 29/08* (2006.01)

(52) U.S. Cl.
CPC .......... *H04L 41/30* (2013.01); *H04L 67/1051* (2013.01); *H04L 67/1097* (2013.01)

(58) Field of Classification Search
CPC ................................. H04L 67/25; H04L 43/10
USPC .................................................. 709/209, 203
See application file for complete search history.

(56) References Cited

U.S. PATENT DOCUMENTS

| | | | |
|---|---|---|---|
| 7,738,504 B1 * | 6/2010 | Deaner .................. | G06F 13/36 370/400 |
| 2003/0172181 A1 * | 9/2003 | Sharma .................... | H04B 1/74 709/238 |
| 2006/0026279 A1 * | 2/2006 | Zigmond ............ | H04L 12/2803 709/224 |
| 2007/0195760 A1 * | 8/2007 | Rahman ................ | H04W 48/18 370/389 |
| 2010/0030818 A1 * | 2/2010 | Cooper ............. | G06F 17/30578 707/703 |
| 2011/0173490 A1 * | 7/2011 | Narayanaswamy | H04L 63/1408 714/4.11 |
| 2013/0223454 A1 * | 8/2013 | Dunbar ................... | H04L 45/44 370/400 |
| 2015/0293708 A1 * | 10/2015 | Lang ..................... | G06F 3/0613 711/114 |

* cited by examiner

*Primary Examiner* — Duyen Doan
(74) *Attorney, Agent, or Firm* — LeClairRyan PLLC

(57) ABSTRACT

The present application provides techniques to interrelate a group of multiple entities. A master entity makes configuration decisions regarding the group of entities and communicates those decisions to the entities. When the master relinquishes the master role, the retiring master selects a new master to accede to the master role. The retiring master releases the master role and ensures that the new master becomes aware of its assignment to the master role. During the time between when the retiring master abdicates and when the new master accedes, the group of entities is temporarily permitted to have no master. The master changes the configuration of the group of entities in a similar way. Using the techniques described herein, a new master may eventually replace the retiring master, and a new configuration may eventually replace the old configuration, without the risk of duplicating or dropping the master role or a configuration change.

15 Claims, 16 Drawing Sheets

Entity A is Master

No Master Entity

Entity B is Master

1600

EVENTUAL CONSISTENCY AMONG MANY CLUSTERS INCLUDING ENTITIES IN A MASTER MEMBER REGIME

RELATED APPLICATIONS

This application claims priority to Provisional Application Ser. No. 62/234,742, filed on Sep. 30, 2015 and entitled "Eventual Consistency among Many Clusters Including Entities in a Master Member Regime." The contents of the aforementioned application are incorporated herein by reference.

BACKGROUND

Computing devices may be organized into clusters that provide services to an accessing computing device, known as a client. Devices that make up the cluster are referred to as nodes of the cluster. Clusters and/or nodes may communicate with each other in order to provide services to other devices.

Among such communicating peer entities, it is useful to define a master role in which it is the master that makes configuration decisions and communicates the results of those decisions to the other entities. In order to achieve this, a master may be chosen from among the entities. The present application is addressed to the problem of reassigning the master role when the current master entity is no longer willing or able to perform the duties of the master, as well as other problems relating to the master role.

DETAILED DESCRIPTION

Figure 1:
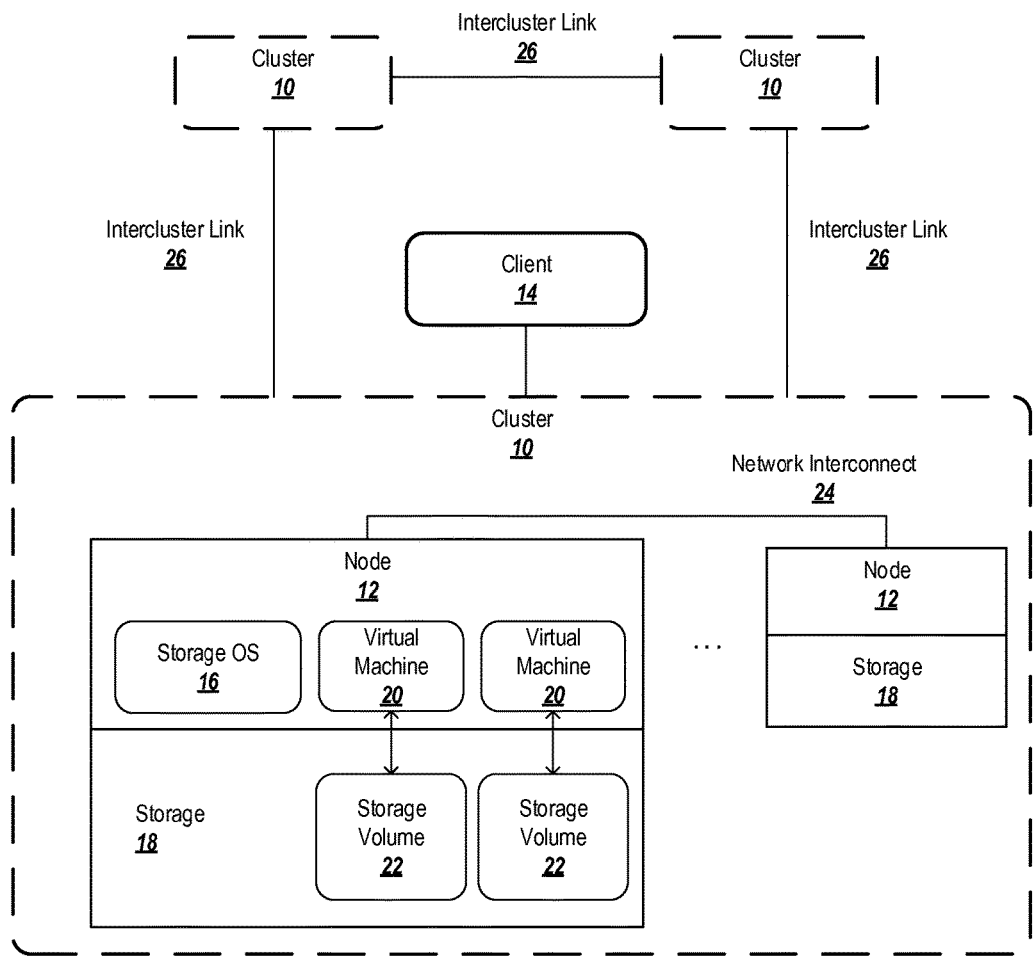
FIG. 1 depicts an exemplary cluster hosting virtual machines.

There are a number of ways to assign mastership among a group of entities. For example, a static assignment of a given entity as the master is convenient but inflexible. It is desirable to be able to pass the 'master' duties from the designated 'master' to another of the entities. The difficulty with many such regimes is that they require inter-entity communication to be functioning. The exemplary embodiments described herein function in an environment in which interconnectedness is more intermittent.

Of course, it is important to prevent the loss of this 'master' role; in the long run, there should be exactly one master. Nonetheless, it has been discovered that, under certain circumstances, it is acceptable for there to be no active master for a short interval.

Exemplary embodiments relate to obtaining consistency among communicating entities. If the multiple entities were all part of the same transactional domain (i.e., a domain in which communications are in the form of transactions that update the state of the entities, and in which all nodes in the domain are part of the transaction), then choosing a master or applying a configuration update would be relatively simple. For example, a transaction could be issued turning mastership off at one entity and turning mastership on at a second entity.

However, not all groups of entities form transactional domains. For example, multiple clusters might communicate with each other without the benefit of being able to affect multiple clusters with a single transaction.

Generally, in transactional domain A (a first entity), the entity captures its own state transition, plus the intention of making a modification to transactional domain B (a second entity). The idea of 'consistency' then applies to the state of both transactional domains. Exemplary embodiments provide techniques to obtain benefits similar to a transactional domain in an environment in which multiple clusters communicate but are not, in fact, a transactional domain. As a result, the clusters can be made to become eventually consistent in a limited period of time.

Using exemplary embodiments described herein, a system can be built in which all nodes will eventually settle in a consistent state. The same idea may be applied to the idea of a 'master' of a collection of entities; all entities eventually know what domain is the master, and the 'master' role can be passed from domain to domain without duplication or dropping.

According to exemplary embodiments, a master can be caused to become a retiring master, abdicating its responsibility as master and also recording the intention to pass the mastership to a designated peer entity. A daemon then takes responsibility for carrying out the intention. In executing this intention, it requires not only the retiring master but also the future master to be functioning. Eventually, that condition will obtain, and mastership can be passed. That transfer can be made idempotent by adding a sequence number on the retiring master, so that the future master can determine that the transfer has not executed already. Only one sequence number need be stored with the mastership, on any one node.

Within any one entity, the act of retiring as master and also of recording the intention to transfer the mastership is an atomic unit. On the new master site, the act of assuming the mastership and of recording the new sequence number value is, similarly, atomic. These two properties, and the idempotency of any one transfer, ensure that the mastership is transferred once only.

Inter-entity eventual consistency goes further. As stated, entities each wish to know the identity of the designated master. The master is responsible for managing the configuration of the group of entities, coordinating changes and announcing new configurations. Thus, if a configuration change is made, the master has the responsibility to inform each of the entities of the configuration changes. These notifications are not instantaneous, and indeed a daemon is responsible for doing the propagation. Until the changes are distributed everywhere, it could be said that the inter-entity state is not consistent, but that it will eventually be made consistent. The same paradigm applies: with every configuration change, the intention to update all the other entities is recorded. In this case, the intention takes the form of a version number update that is used as a shorthand for 'all changes up to and including this named version.'

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

As used herein, the identifiers "a" and "b" and "c" and similar designators are intended to be variables representing any positive integer. Thus, for example, if an implementation sets a value for a=5, then a complete set of components 122-*a* may include components 122-1, 122-2, 122-3, 122-4 and 122-5. The embodiments are not limited in this context.

System Overview

FIGS. 1A and 1B depict suitable environments in which the exemplary destination paths and storage mappings may be employed.

FIG. 1A depicts an example of a cluster 10 suitable for use with exemplary embodiments. A cluster 10 represents a logical collection of one or more nodes 12 that perform services, such as data storage or processing, on behalf of one or more clients 14.

In some embodiments, the nodes 12 may be special-purpose controllers, such as fabric-attached storage (FAS) controllers, optimized to run a storage operating system 16 and manage one or more attached storage devices 18. The nodes 12 provide network ports that clients 14 may use to access the storage 18. The storage 18 may include one or more drive bays for hard disk drives (HDDs), flash storage, a combination of HDDs and flash storage, and other non-transitory computer-readable storage mediums.

The storage operating system 16 may be an operating system configured to receive requests to read and/or write data to one of the storage devices 18 of the cluster 10, to perform load balancing and assign the data to a particular storage device 18, and to perform read and/or write operations (among other capabilities). The storage operating system 16 serves as the basis for virtualized shared storage infrastructures, and may allow for nondisruptive operations, storage and operational efficiency, and scalability over the lifetime of the system. One example of a storage operating system 16 is the Clustered Data ONTAP® operating system of NetApp, Inc. of Sunnyvale, Calif.

The nodes 12 may be connected to each other using a network interconnect 24. One example of a network interconnect 24 is a dedicated, redundant 10-gigabit Ethernet interconnect. The interconnect 24 allows the nodes 12 to act as a single entity in the form of the cluster 10.

A cluster 10 provides hardware resources, but clients 14 may access the storage 18 in the cluster 10 through one or more storage virtual machines (SVMs) 20. SVMs 20 may exist natively inside the cluster 10. The SVMs 20 define the storage available to the clients 14. SVMs 20 define authentication, network access to the storage in the form of logical interfaces (LIFs), and the storage itself in the form of storage area network (SAN) logical unit numbers (LUNs) or network attached storage (NAS) volumes.

SVMs 20 store data for clients 14 in flexible storage volumes 22. Storage volumes 22 are logical containers that contain data used by applications, which can include NAS data or SAN LUNs. The different storage volumes 22 may represent distinct physical drives (e.g., different HDDs) and/or may represent portions of physical drives, such that more than one SVM 20 may share space on a single physical drive.

Clients 14 may be aware of SVMs 20, but they may be unaware of the underlying cluster 10. The cluster 10 provides the physical resources the SVMs 20 need in order to serve data. The clients 14 connect to an SVM 20, rather than to a physical storage array in the storage 18. For example, clients 14 require IP addresses, World Wide Port Names (WWPNs), NAS volumes, SMB (CIFS) shares, NFS exports, and LUNs. SVMs 20 define these client-facing entities, and use the hardware of the cluster 10 to deliver the storage services. An SVM 20 is what users connect to when they access data.

Connectivity to SVMs 20 is provided through logical interfaces (LIFs). A LIF has an IP address or World Wide Port Name used by a client or host to connect to an SVM 20. A LIF is hosted on a physical port. An SVM 20 can have LIFs on any cluster node 12. Clients 14 can access data regardless of the physical location of the data in the cluster 10. The cluster 10 will use its interconnect 24 to route traffic to the appropriate location regardless of where the request arrives. LIFs virtualize IP addresses or WWPNs, rather than permanently mapping IP addresses and WWPNs to NIC and HBA ports. Each SVM 20 may use its own dedicated set of LIFs.

Thus, like compute virtual machines, SVMs 20 decouple services from hardware. Unlike compute virtual machines, a single SVM 20 can use the network ports and storage of many nodes 12, enabling scale-out. One node's 12 physical network ports and physical storage 18 also can be shared by many SVMs 20, enabling multi-tenancy.

A single cluster 10 can contain multiple SVMs 20 targeted for various use cases, including server and desktop virtualization, large NAS content repositories, general-purpose file services, and enterprise applications. SVMs 20 can also be used to separate different organizational departments or tenants. The components of an SVM 20 are not permanently tied to any specific piece of hardware in the cluster 10. An SVM's volumes 22, LUNs, and logical interfaces can move to different physical locations inside the cluster 10 while maintaining the same logical location to clients 14. While physical storage and network access moves to a new location inside the cluster 10, clients 14 can continue accessing data in those volumes or LUNs, using those logical interfaces.

This capability allows a cluster 10 to continue serving data as physical nodes 12 are added or removed from the cluster 10. It also enables workload rebalancing and native, nondisruptive migration of storage services to different media types, such as flash, spinning media, or hybrid configurations. The separation of physical hardware from storage services allows storage services to continue as all the physical components of a cluster are incrementally replaced. Each SVM 20 can have its own authentication, its own storage, its own network segments, its own users, and its own administrators. A single SVM 20 can use storage 18 or network connectivity on any cluster node 12, enabling scale-out. New SVMs 20 can be provisioned on demand, without deploying additional hardware.

One capability that may be provided by a storage OS 16 is storage volume snapshotting. When a snapshot copy of a volume 22 is taken, a read-only copy of the data in the volume 22 at that point in time is created. That means that application administrators can restore LUNs using the snapshot copy, and end users can restore their own files.

Snapshot copies are high-performance copies. When writes are made to a flexible volume 22 that has an older snapshot copy, the new writes are made to free space on the underlying storage 18. This means that the old contents do not have to be moved to a new location. The old contents stay in place, which means the system continues to perform quickly, even if there are many Snapshot copies on the system. Volumes 22 can thus be mirrored, archived, or nondisruptively moved to other aggregates.

Therefore, snapshotting allows clients 14 to continue accessing data as that data is moved to other cluster nodes. A cluster 10 may to continue serving data as physical nodes 12 are added or removed from it. It also enables workload rebalancing and nondisruptive migration of storage services to different media types. No matter where a volume 22 goes, it keeps its identity. That means that its snapshot copies, its replication relationships, its deduplication, and other characteristics of the flexible volume remain the same.

The storage operating system 16 may utilize VM-agnostic or VM-independent formatting, destination paths, and configuration options for storing data objects in the storage devices 18. For example, Clustered Data ONTAP® uses the NetApp WAFL® (Write Anywhere File Layout) system, which delivers storage and operational efficiency technologies such as fast, storage-efficient copies; thin provisioning; volume, LUN, and file cloning; deduplication; and compression. WAFL® accelerates write operations using nonvolatile memory inside the storage controller, in conjunction with optimized file layout on the underlying storage media. Clustered Data ONTAP® offers integration with hypervisors such as VMware ESX® and Microsoft® Hyper-V®. Most of the same features are available regardless of the protocol in use.

Although the data objects stored in each VM's storage volume 22 may be exposed to the client 14 according to VM-specific formatting and path settings, the underlying data may be represented according to the storage operating system's VM-agnostic configuration.

Management of the cluster 10 is often performed through a management network. Cluster management traffic can be placed on a separate physical network to provide increased security. Together, the nodes 12 in the cluster 10, their client-facing network ports (which can reside in different network segments), and their attached storage 18 form a single resource pool.

In exemplary embodiments, multiple clusters may communicate with each other using network messages. Nodes within a cluster may communicate using transactions. Among the clusters and/or nodes, a master may be chosen. When the current master is no longer willing or able to perform the master role, the current master can retire and pass mastership to an acceding master. Exemplary techniques for passing mastership to a new master are next described. The exemplary techniques are particularly well-suited for use in an environment in which communications are intermittent, and may help to provide eventual consistency among the communicating entities.

Passing the Master Role

Figure 2A:
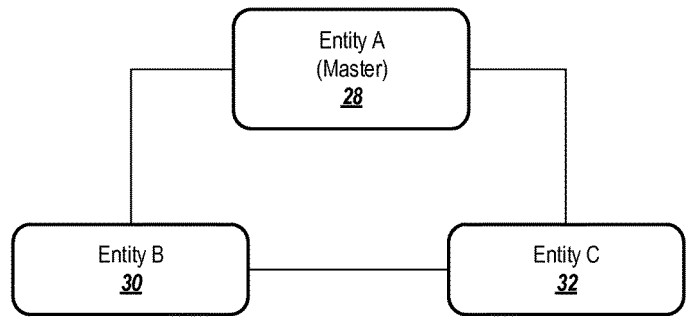
FIGS. 2A-2E depict examples of potential problems that can occur when passing the master role among entities.

FIGS. 2A-2E depict problems that can occur when passing mastership among communicating entities. FIG. 2A depicts three exemplary entities. In an initial state, a first entity 28 is the current master, which makes configuration decisions for the group of entities and communicates those configuration decisions to the second entity 30 and the third entity 32.

Figure 2B:
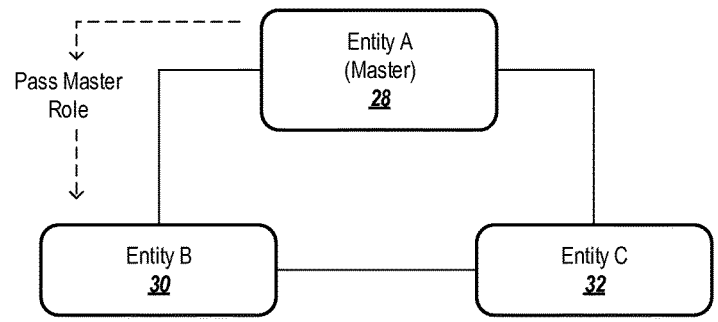

At some point, the first entity 28 may decide to relinquish the mater role and pass mastership over the group of entities to the second entity 30. Accordingly, as shown in FIG. 2B, the first entity 28 may inform the second entity 28 that the second entity 30 should assume the master role.

It makes intuitive sense that there should be exactly one master among the entities—no more, and no less. Accordingly, in order to ensure that the master role continues to be performed while mastership is passed, in this scenario the first entity 28 continues to perform the master role until receiving confirmation from the second entity 30 that the master role has been passed.

Figure 2C:
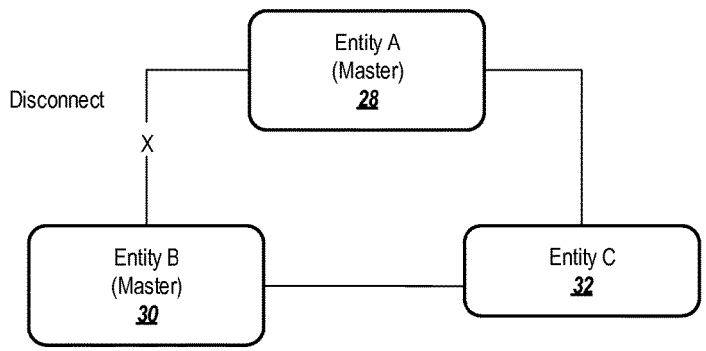

Such a setup may function appropriately in a system in which communication between the entities is stable and reliable. However, problems can occur if communication is intermittent. For example, FIG. 2C depicts a situation in which the communication link between the first entity 28 and the second entity 30 disconnects after the first entity 28 has passed the master role, but before the second entity 30 has sent an acknowledgement that the second entity 30 has assumed the master role. Accordingly, the second entity 30 believes itself to be the master, but the first entity 28 is continuing to perform the master role until receiving the acknowledgement.

Figure 2D:
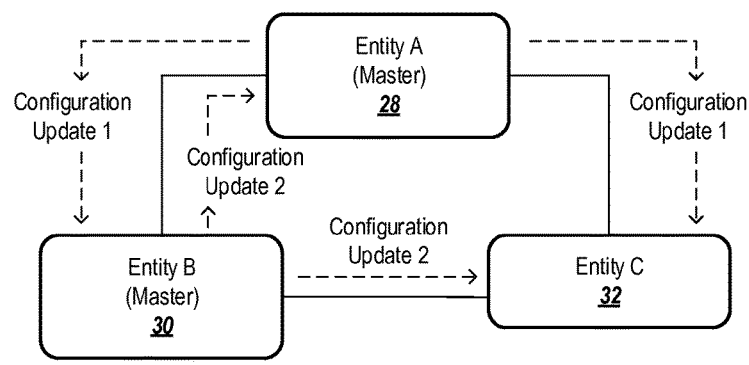

As a result, if the first entity 28 and the second entity 30, each in their role as master, decide to issue a configuration update, conflicting information may be sent through the communicating entities. For example, FIG. 2D depicts a situation in which the first entity 28, believing itself to be the master, issues a first configuration update and communicates the update to the second entity 30 and the third entity 32. Meanwhile, the second entity 30, believing itself to be master, issues a second configuration update to the first entity 28 and the third entity 32. The first entity 28 receives the second configuration update and recognizes that there is a problem—the first entity 28 believes itself to be the master and so should not be receiving configuration updates from other entities. Similarly, the second entity 30 recognizes that a problem exists when it receives the first configuration update from the first entity 28. However, the third entity 32, having received both the first configuration update and the second configuration update, does not know which configuration update is from the true master. Indeed, if the two configuration updates are not received at precisely the same time, then the third entity 32 may assume that mastership was passed in between the two configuration updates, and may simply apply the configuration updates in the order in which they are received.

Figure 2E:
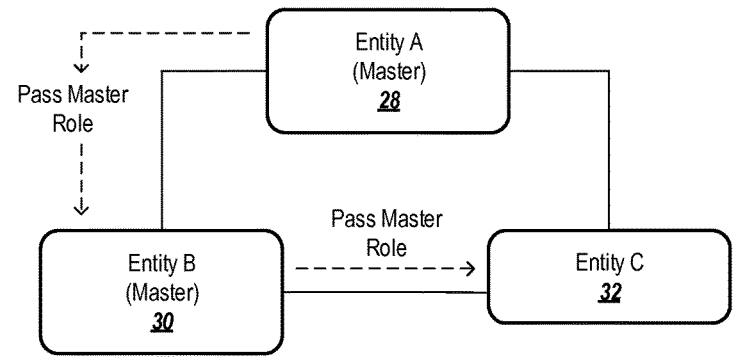

Similarly, when both the first entity 28 and the second entity 30 believe themselves to be master, they may both decide to pass mastership to a new entity, as shown in FIG. 2E. In this scenario, the first entity 28, having failed to receive an acknowledgement when it passed mastership to the second entity 30, attempts to pass the master role to the second entity 30 a second time. Meanwhile, the second entity 30 decides to pass the master role to the third entity 32. Consequently, a situation may persist in which multiple masters exist among the peer entities.

Figure 3A:
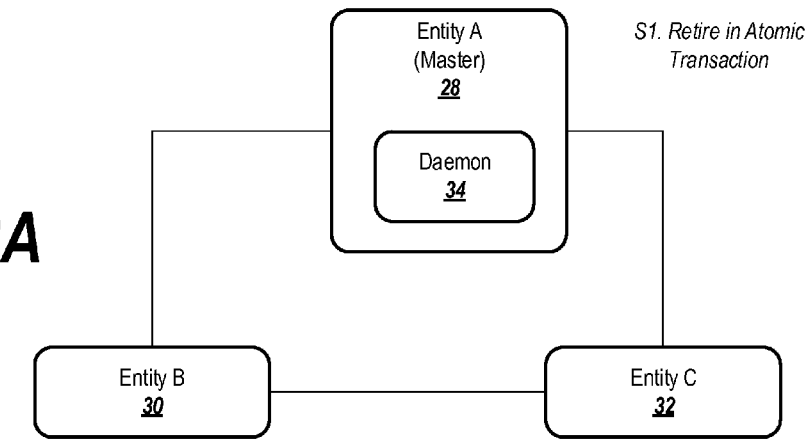
FIGS. 3A-3C depict an overview of an exemplary technique for passing mastership among entities according to an exemplary embodiment.
Figure 3B:
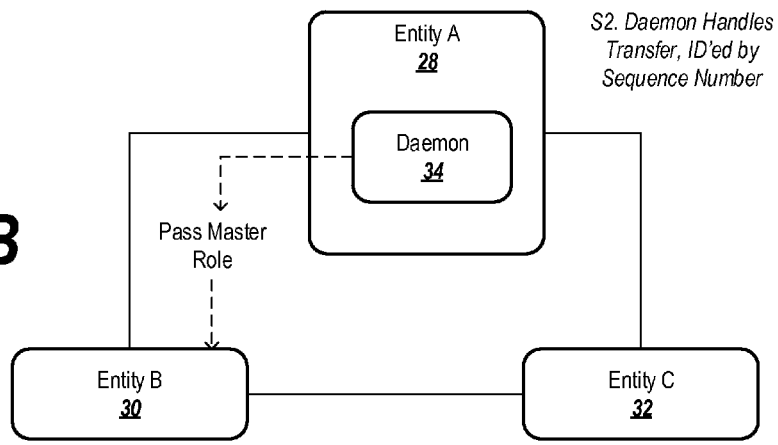
Figure 3C:
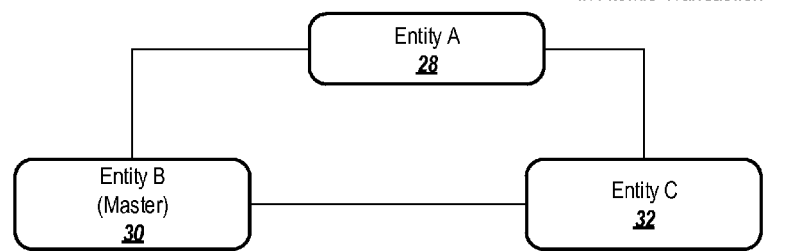

In order to address these and other problems, exemplary embodiments provide methods, mediums, and systems for passing the master role between entities, as shown in FIGS. 3A-3C. According to exemplary embodiments, a daemon 34 on the retiring master 28 ensures that the master role is correctly passed (FIG. 3A). The retiring master 28 decides to pass the master role to the second entity 30, and therefore passes control to the daemon 34. The daemon 34 handles the communication with the second entity 30 and ensures that the second entity 30 receives the notification that the master role has been passed. The daemon 34 tags the transaction with a sequence number that identifies the master transition.

The group of entities is allowed to exist temporarily in a state in which there is no master (FIG. 3B). Eventually, the second entity 30 accedes to the master role (FIG. 3C). In order to accomplish this, the second entity 30 checks the sequence number added by the daemon 34 and verifies that a master transition having the tagged sequence number has not already been performed. If an old sequence number is used, the second entity 30 determines that the master transition is an old transaction, and does not make any changes (such as acceding to the master role).

Figures 4, 5:
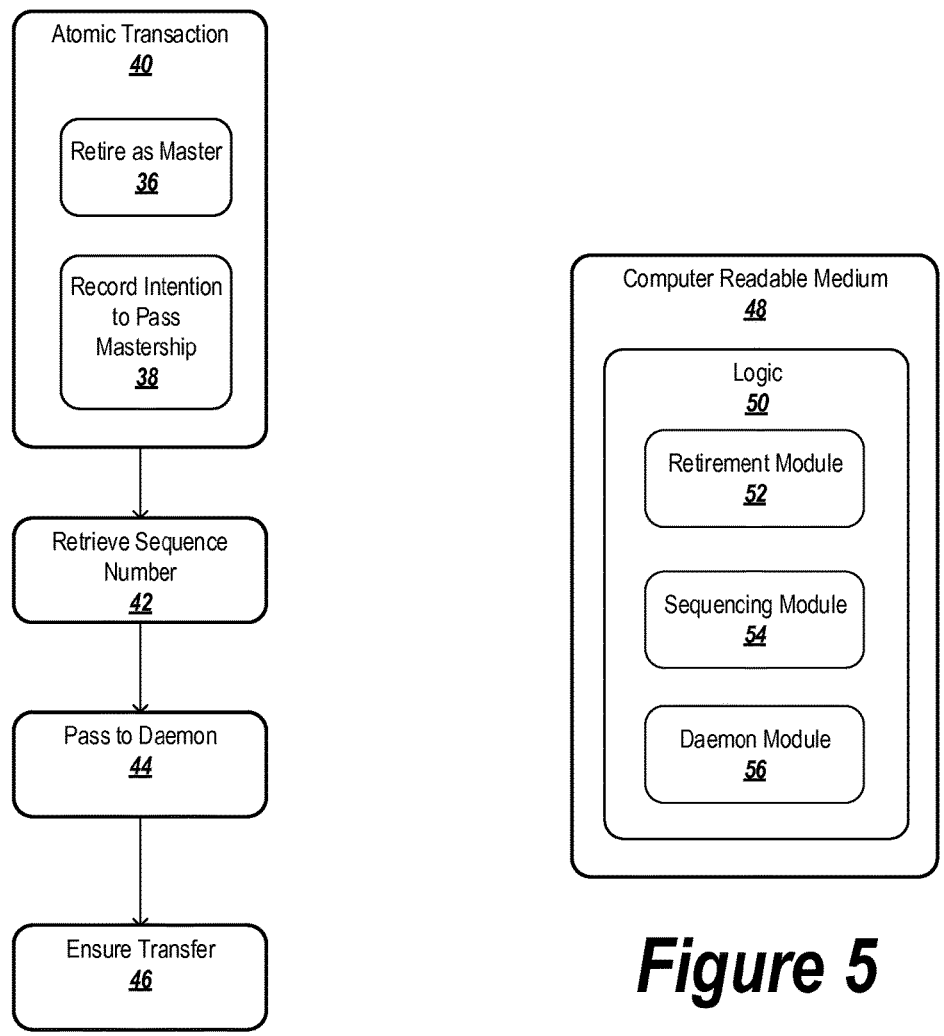
FIG. 4 depicts an exemplary method performed by a retiring master for passing the master role to a new master.
FIG. 5 depicts exemplary logic that may be employed by a retiring master for passing the master role to a new master.

FIGS. 4 and 5 describe the passing of the mastership role from the perspective of the retiring master. FIG. 4 is a flowchart describing an exemplary method performed by the retiring master. FIG. 5 depicts an exemplary non-transitory computer readable medium 48 storing logic 50 in the form of instructions that, when executed by a processor, cause the processor to perform the method of FIG. 4. The logic 50 may include instructions for providing one or more modules that each perform one or more of the steps or algorithms of FIG. 4.

As shown in FIG. 4, at step 36 the retiring master relinquishes the master role. The retiring master may end any processes that are involved in the master role. For example, the master may be running a process that analyzes the status of the entities that are overseen by the master, and decides when and how to update a configuration of the entities. At step 36, the master may end this process. The master may also update any internal flags, states, or statuses that indicate the status of the current entity as the master.

At step 38, the retiring master records its intention to pass mastership to the acceding master. For example, a field or configuration setting may be provided to indicate the identity of the new entity that the current master has selected to accede to the mastership role. The current master may select the new master according to any number of algorithms (e.g., a round robin algorithm, a load balancing algorithm, a random selection, etc.). Recording the intention to retire may automatically cause a number of steps to be carried out to securely effect the transfer of the master role (e.g., steps 42, 44, and 46).

Retirement from the master role is performed as an atomic transaction 40. This means that the entity retires at the same time (in the same transaction) that the entity records its intent to retire. Any sub-transactions of an atomic transaction occur together; if one or more sub-transactions cannot be carried out, then none of the sub-transactions of the atomic transaction are effected. This atomic nature of the transaction helps to ensure that the master role is passed only once, after the decision to retire has been made. The atomic transaction 40 may be performed by a retirement module 52 in the logic 50 (FIG. 5).

At step 42, the master may retrieve the next sequence number associated with a master transition. Each time the master role is passed, this transaction is associated with a sequence number that ensures that the transaction is unique. By only carrying out master transitions having a higher sequence number than any that the acceding master has already seen, an acceding master can be ensured that the master transaction is unique. This means that master role transfers are idempotent.

When an entity accedes to mastership, the entity records the current sequence number associated with the transaction in an internal memory location assigned for that purpose. At step 42, the master retrieves the last sequence number and increments it to determine the next sequence number. Step 42 may be performed by a sequencing module 54 (FIG. 5).

At step 44, the master may fork a new process known as a daemon, and may pass the sequence number retrieved at step 42 to the daemon. Alternatively, the master entity may fork the daemon process and the daemon may perform step 42. The daemon is responsible for ensuring that the master's intention to pass mastership is carried out.

Accordingly, at step 46, the daemon may package the new sequence number and a command to accede to mastership into a message and may forward the message to the new master. The daemon may wait a predetermined period of time to receive an acknowledgement from the acceding master that the acceding master has assumed the master role. If an acknowledgement is not received in the predetermined amount of time, then the daemon may repeat the message until an acknowledgement is received.

Steps 44 and 46 may be carried out by a daemon module 56.

Figure 6:
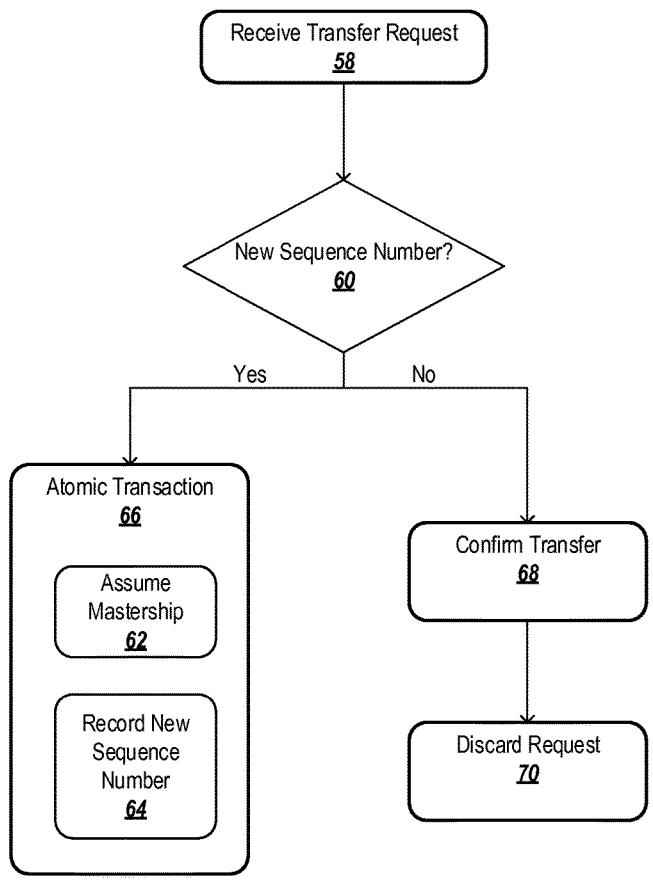
FIG. 6 depicts an exemplary method performed by an acceding master when receiving a notification that the mastership role has been passed to the acceding master.
Figure 7:
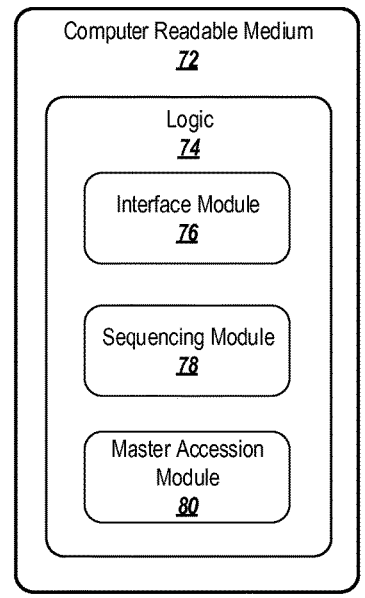
FIG. 7 depicts exemplary logic that may be employed by an acceding master when receiving the master role from a retiring master.

FIGS. 6 and 7 depict corresponding steps from the acceding master's point of view. FIG. 6 is a flowchart of steps performed when an entity receives a message indicating that the master role has been transferred to the entity, and FIG. 7 depicts an exemplary non-transitory computer readable medium 72 storing logic 74 that, when executed by a processor, causes the processor to perform the method depicted in FIG. 6. The logic 74 may take the form of modules that each perform one or more of the steps or algorithms of FIG. 6.

With reference to FIG. 6, at step 58, the entity may receive a message indicating a transaction that transfers the master role to the entity. A communications interface may be set up for receiving transactions; for example, the current master may designate a port on which transaction messages are to be sent and received. The entity may listen on the port for transaction messages and may parse the message to determine a type of the transaction (e.g., configuration update, master transition, state change, etc.). Step 58 may be performed by an interface module 76 (FIG. 7).

At step 60, the entity may determine whether the transaction received at step 58 is a new transaction. This may be achieved by comparing the sequence number associated with the transaction to the most recent master transition observed by the entity (or a default value such as "0," if no previous transition has been observed). Step 60 may be performed by a sequencing module 78 (FIG. 7).

If the decision at step 60 is "yes" (i.e., the sequence number associated with the received transaction indicates that the transaction is a new master transition), processing may proceed to step 62. At step 62, the entity may assume the master role. For example, the entity may create a new process that analyzes the entities that are in communication with each other, and decides when and how to update the configuration of the entities. The entity may also update an internal state, configuration setting, flag, etc. that indicates that the entity is the current master.

At step 64, the entity may record a new sequence number for the next master transition. For example, the entity may increment the sequence number associated with the transaction received at step 58 and store the incremented number in a storage location set aside for the purpose of storing the sequence number. Steps 62 and 64 may be performed as an atomic transaction 66. The atomic transaction 66 may be performed by a master accession module 80 (FIG. 7).

If the decision at step 60 is "no," (i.e., the sequence number associated with the received transaction indicates that the transaction is not a new master transition), processing may proceed to step 68. This may be because, for example, the current entity has already seen the present transaction, but the entity's previous confirmation that it was acceding to mastership was lost before it was received at the previous retiring master. Therefore, at step 68, the entity may confirm that the transfer has been effected, and at step 70 the entity may discard the current transaction without taking further action. Steps 68 and 70 may be performed by the interface module 76 (FIG. 7).

Configuration Updates

Figure 8:
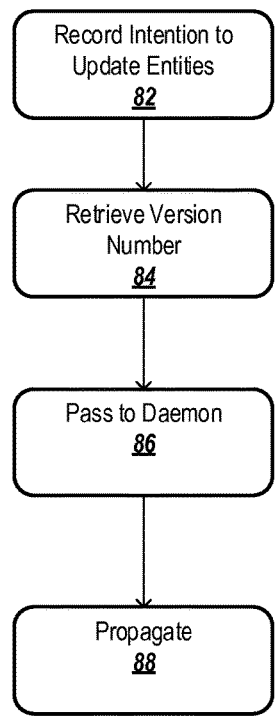
FIG. 8 depicts an exemplary method performed by a master entity for updating a configuration of other entities in communication with the master entity.
Figure 9:
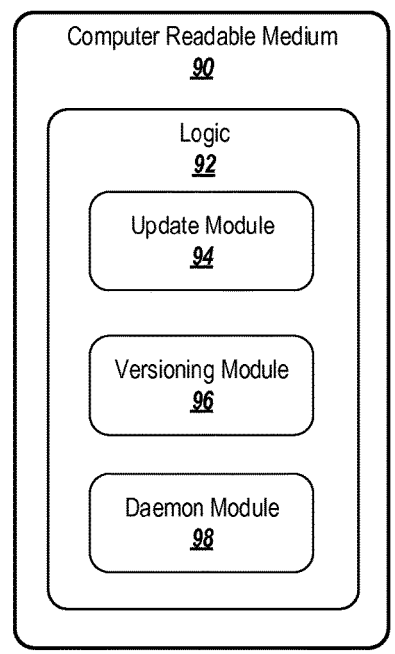
FIG. 9 depicts exemplary logic that may be employed by a master entity for updating the configuration of other entities in communication with the master entity.

Configuration updates may be carried out in a similar manner to master transitions. FIGS. 8-11 depict methods and mediums suitable for use with exemplary embodiments FIGS. 8 and 9 describe exemplary techniques performed by a master entity for updating a configuration of other entities in communication with the master entity. FIG. 8 is a flowchart describing an exemplary method performed by the master. FIG. 9 depicts an exemplary non-transitory computer readable medium 90 storing logic 92 in the form of instructions that, when executed by a processor, cause the processor to perform the method of FIG. 8. The logic 90 may include instructions for providing one or more modules that each perform one or more of the steps or algorithms of FIG. 8.

As shown in FIG. 8, at step 82 the master records an intention to update entities overseen by the master. The master may update a configuration table storing configuration values used in the network, and may apply the stored configuration values locally at the master by updating one or more local configuration settings with the stored values. From this moment until the values are applied by the entities overseen by the master, the network may be in a temporary inconsistent state (i.e., a state in which not all of the entities overseen by the master share the same configuration values). Nonetheless, by applying the methods described herein, the system may be made eventually consistent. Step 82 may be performed by an update module 94 (FIG. 9).

At step 84, the master may retrieve the next version number associated with a configuration update. Each time the configuration is updated, this transaction is associated with a version number that ensures that the transaction is unique. By only carrying out configuration updates having a higher version number than any that an entity has already seen, the entity applying the configuration update can be ensured that the configuration transaction is unique. This means that configuration updates are idempotent.

When an entity applies a configuration update, the entity records the current version number associated with the transaction in an internal memory location assigned for that purpose. At step 84, the master retrieves the last version number and increments it to determine the next version number. Step 84 may be performed by a versioning module 96 (FIG. 9).

At step 86, the master may fork a new process known as a daemon, and may pass the version number retrieved at step 84 to the daemon. Alternatively, the master entity may fork the daemon process and the daemon may perform step 84. The daemon is responsible for ensuring that the master's intention to update the configuration is carried out.

Accordingly, at step 88, the daemon may package the new version number and a command to update a device's configuration into a message, and may forward the message to each device overseen by the master (e.g., in a broadcast, a multi-cast targeted at the devices overseen by the master, or a series of unicast messages to each device). The daemon may wait a predetermined period of time to receive an acknowledgement from the entities being configured that the entities have applied the configuration update. If an acknowledgement is not received in the predetermined amount of time, then the daemon may repeat the message until an acknowledgement is received.

Steps 86 and 88 may be carried out by a daemon module 98.

Figures 10, 11:
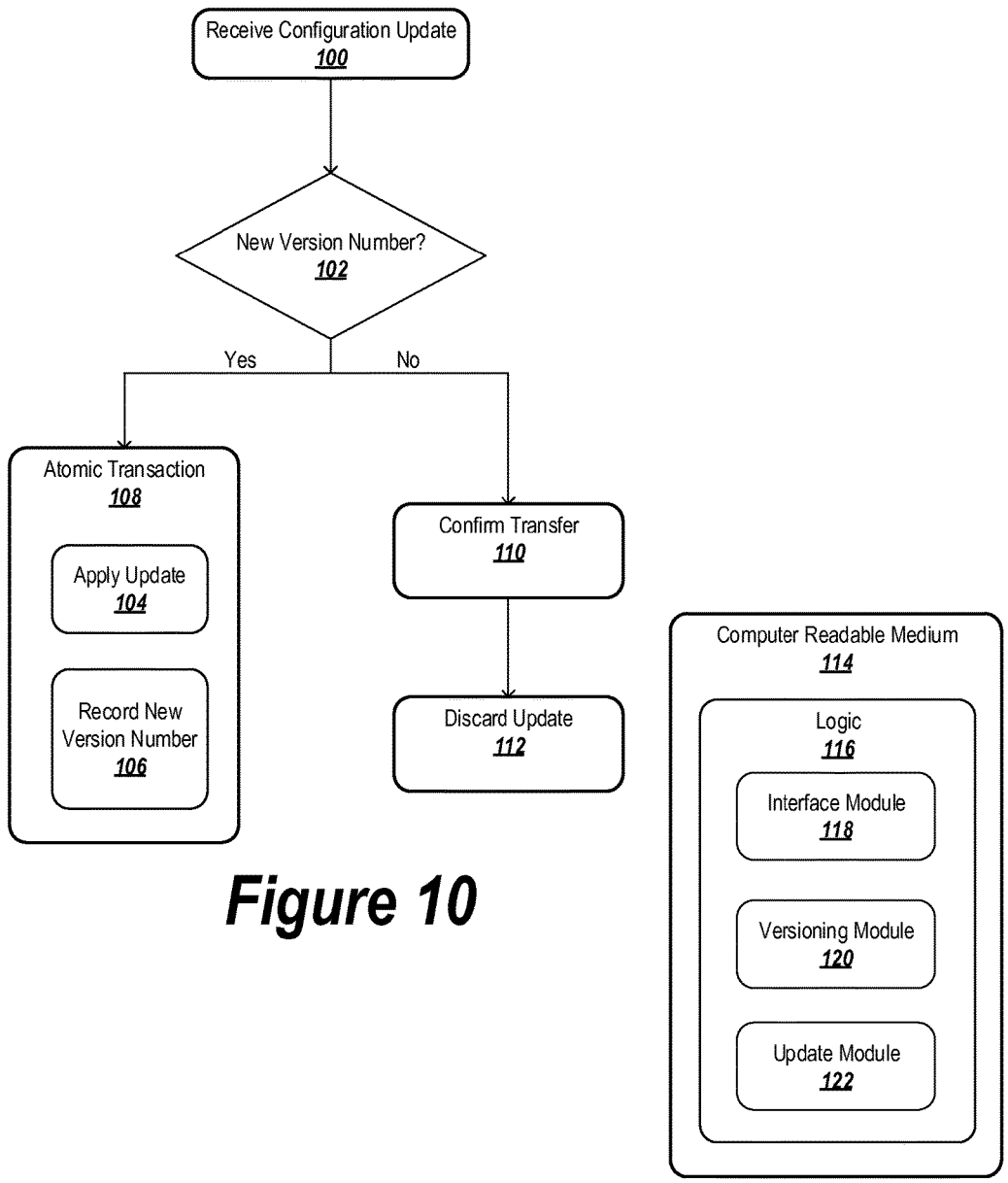
FIG. 10 depicts an exemplary method performed by an entity when receiving a configuration update from a master entity.
FIG. 11 depicts exemplary logic that may be employed by an entity when receiving an update from a master entity.

FIGS. 10 and 11 depict corresponding steps from perspective of the entities receiving the configuration update. FIG. 11 is a flowchart of steps performed when an entity receives a message indicating a configuration update, and FIG. 7 depicts an exemplary non-transitory computer readable medium 114 storing logic 116 that, when executed by a processor, causes the processor to perform the method depicted in FIG. 10. The logic 116 may take the form of modules that each perform one or more of the steps or algorithms of FIG. 10.

With reference to FIG. 10, at step 100, the entity may receive a message indicating a transaction that updates the entity's configuration settings. A communications interface may be set up for receiving transactions; for example, the current master may designate a port on which transaction messages are to be sent and received. The entity may listen on the port for transaction messages and may parse the message to determine a type of the transaction (e.g., configuration update, master transition, state change, etc.). Step 100 may be performed by an interface module 118 (FIG. 11).

At step 102, the entity may determine whether the transaction received at step 100 is a new transaction. This may be achieved by comparing the version number associated with the transaction to the most recent configuration update observed by the entity (or a default value such as "0," if no previous transaction has been observed). Step 102 may be performed by a versioning module 120 (FIG. 11).

If the decision at step 102 is "yes" (i.e., the version number associated with the received transaction indicates that the transaction is a configuration update), processing may proceed to step 104. At step 104, the entity may apply the configuration update. For example, the entity may apply configuration values contained in the configuration update locally at the entity by updating one or more local configuration settings with the received values.

At step 106, the entity may record a new version number for the next configuration update. For example, the entity may increment the version number associated with the transaction received at step 100 and store the incremented number in a storage location set aside for the purpose of storing the version number. Steps 104 and 106 may be performed as an atomic transaction 108. The atomic transaction 108 may be performed by an update module 122 (FIG. 11).

If the decision at step 102 is "no," (i.e., the version number associated with the received transaction indicates that the transaction is not a configuration update), processing may proceed to step 110. This may be because, for example, the current entity has already seen the present transaction, but the entity's previous confirmation that it had applied the configuration update was lost before it was received at the previous retiring master. Therefore, at step 110, the entity may confirm that the configuration update has been applied, and at step 112 the entity may discard the current transaction without taking further action. Steps 110 and 112 may be performed by the interface module 118 (FIG. 11).

In order to perform the above-described steps, one or more data structures may be employed. An exemplary message data structure is next described.

Communications

Figure 12:
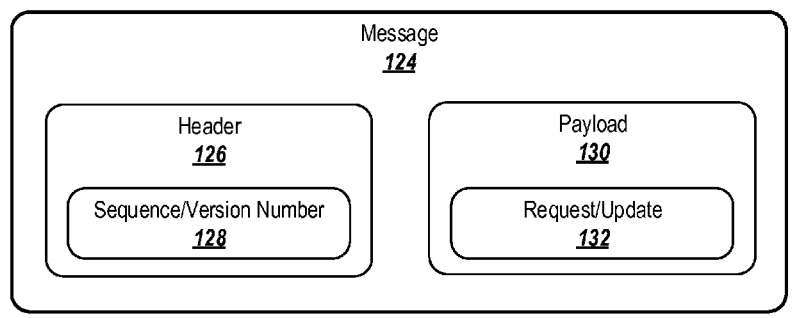
FIG. 12 depicts an exemplary message structure suitable for use with exemplary embodiments.

FIG. 12 depicts an exemplary data structure suitable for use as a message format for communicating transactions, such as master role transition transactions or status change updates.

A message 124 may be of a predetermined or non-predetermined size. The message 124 may include a fixed-length or non-fixed-length header 126 that includes metadata describing the message 124 and/or the message contents. Among other elements, the header 126 may include a field 128 for the above-described sequence number or version number. The field 128 may be located at a predetermined location or offset in the header 126 so that an entity receiving the message may immediately locate the sequence or version number upon receipt of the message 124. Alternatively or in addition, the field 128 may be set off by one or more special characters to allow the receiving entity to parse the header 126 to locate the sequence or version number.

The header 126 may also optionally include a flag or identification of the type of transaction that is included in the payload 130. For example, the flag or identification may indicate that the transaction is a master transfer, or a configuration update, or a state change, etc.

The message 124 may also include a payload 130, which may be of variable or non-variable length. Among other things, the payload 130 may include a field 132 containing any information used to pass mastership, or configuration values to be applied in a configuration update.

The exemplary message 214 may be employed in communications among the entities. For example, FIGS. 13A-13C depict exemplary communications that occur when a master role transfer occurs.

Figure 13A:
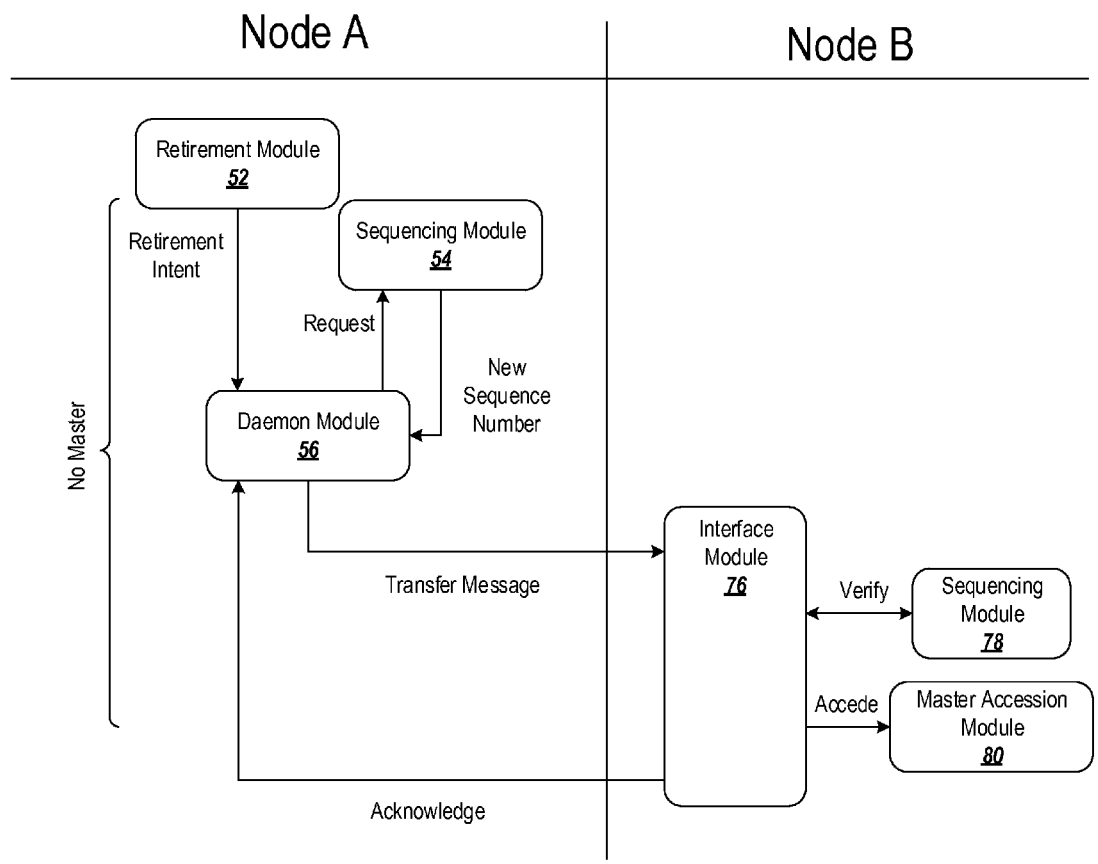
FIGS. 13A-13C depict exemplary communications between the modules of a retiring master and an acceding master when the master role is passed.
Figure 13B:
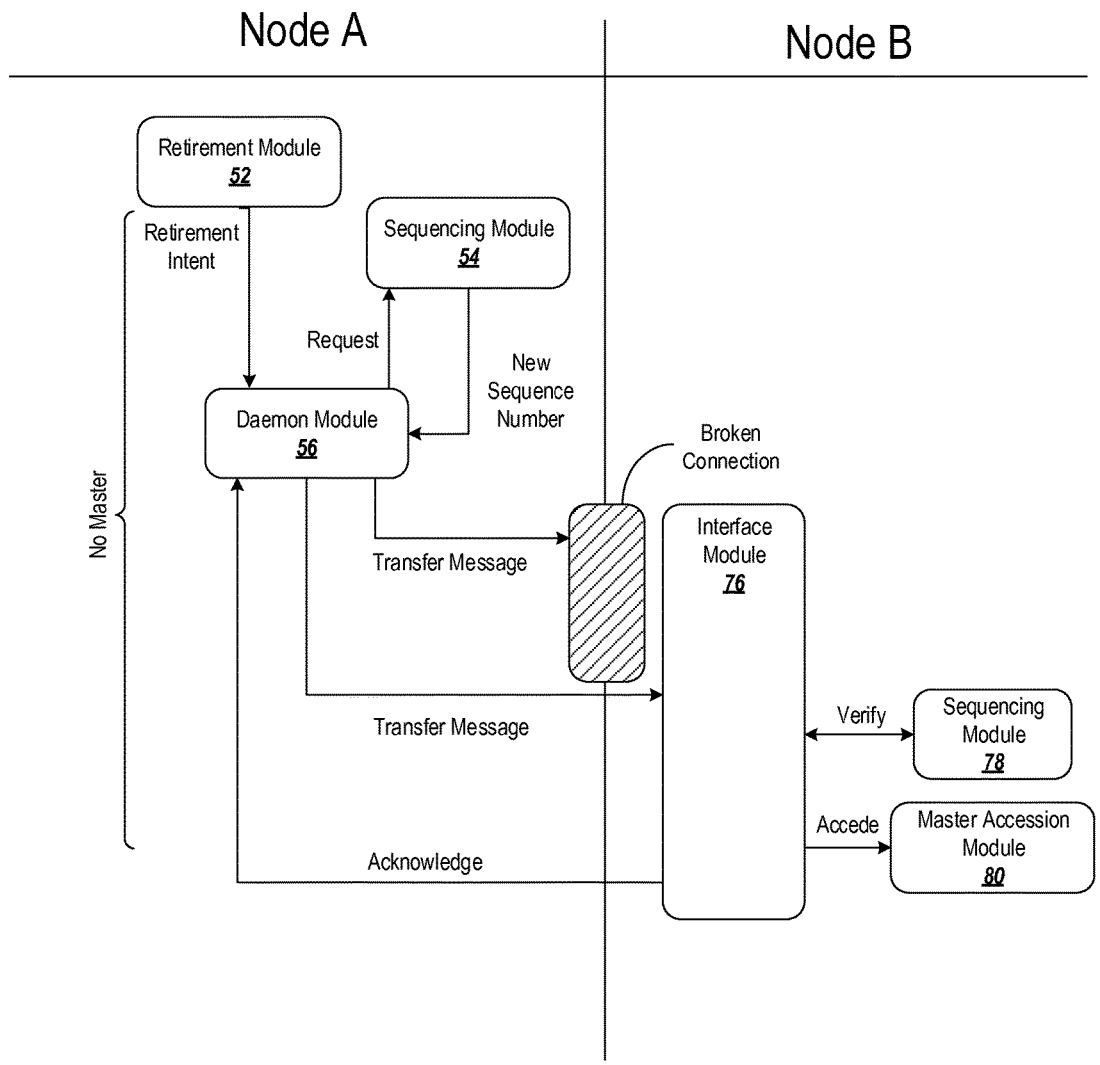
Figure 13C:
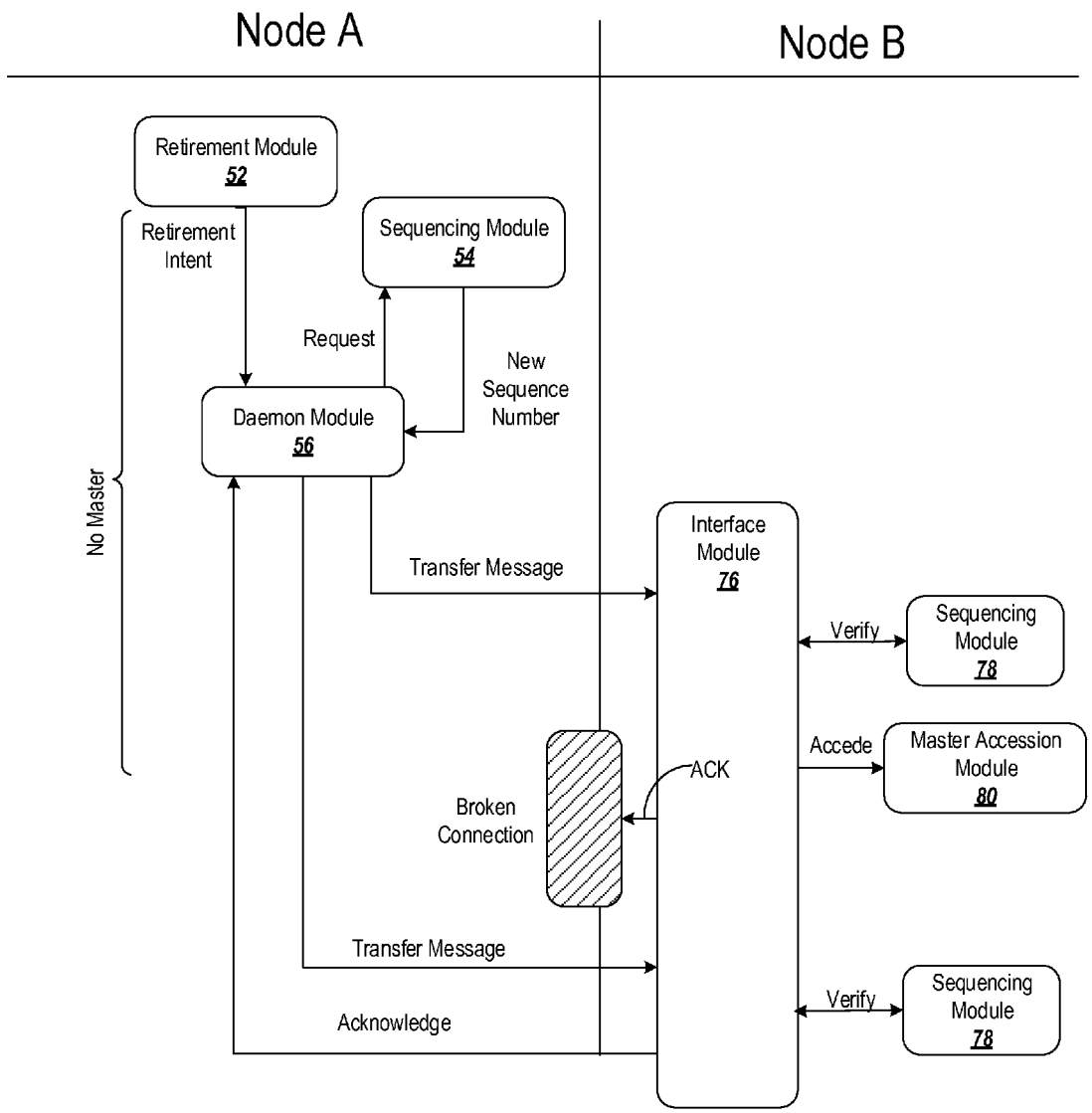

As shown in each of FIGS. 13A-13C, there is a period of time in which no master exists among the entities. The time period generally corresponds to the time from when the retirement module 52 on the first node registers its intent to relinquish the mastership and when the master accession module 80 on the second node accedes to mastership. As shown in FIGS. 13B and 13C, this time period does not necessarily correspond to the amount of time between when the original master relinquishes mastership and when the original master is informed that the second node has acceded to mastership (compare to FIGS. 2A-2C, in which the original master retains control until the new master informs the original master that it has acceded to mastership).

Figure 14A:
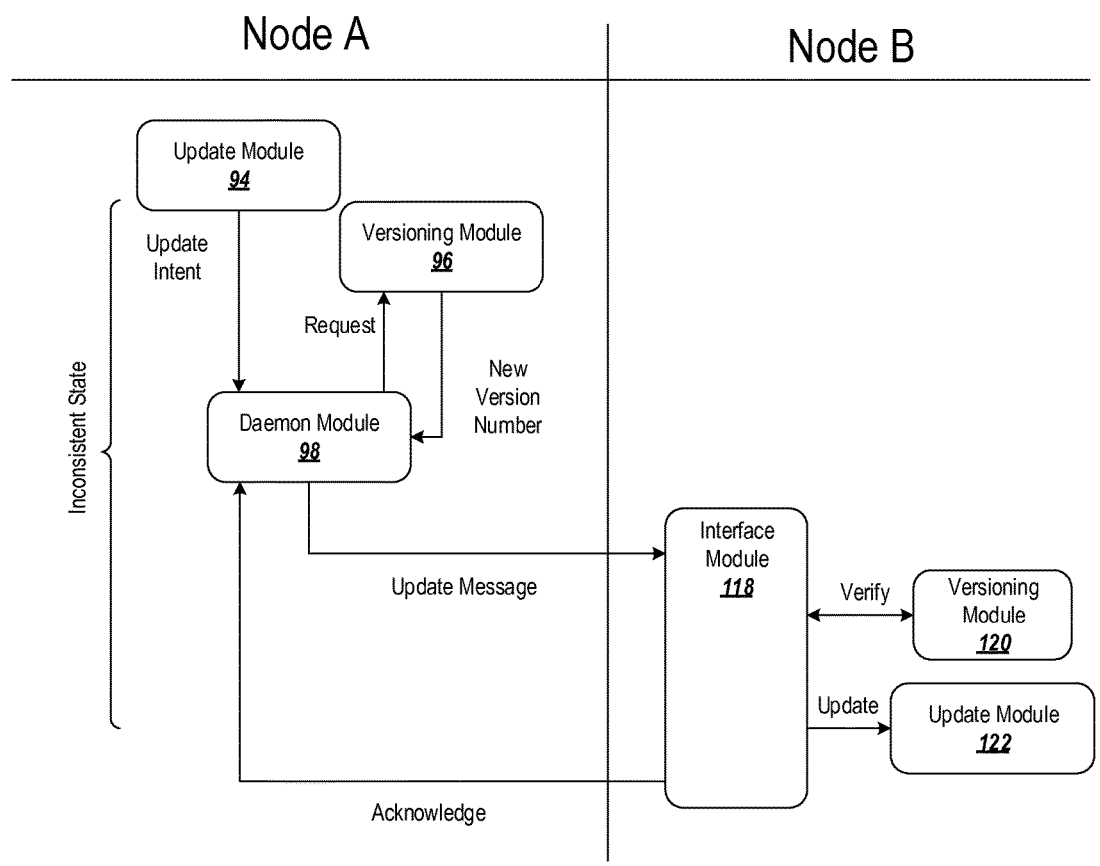
FIGS. 14A-14C depict exemplary communications between a master and another entity for updating a configuration of the entities.
Figure 14B:
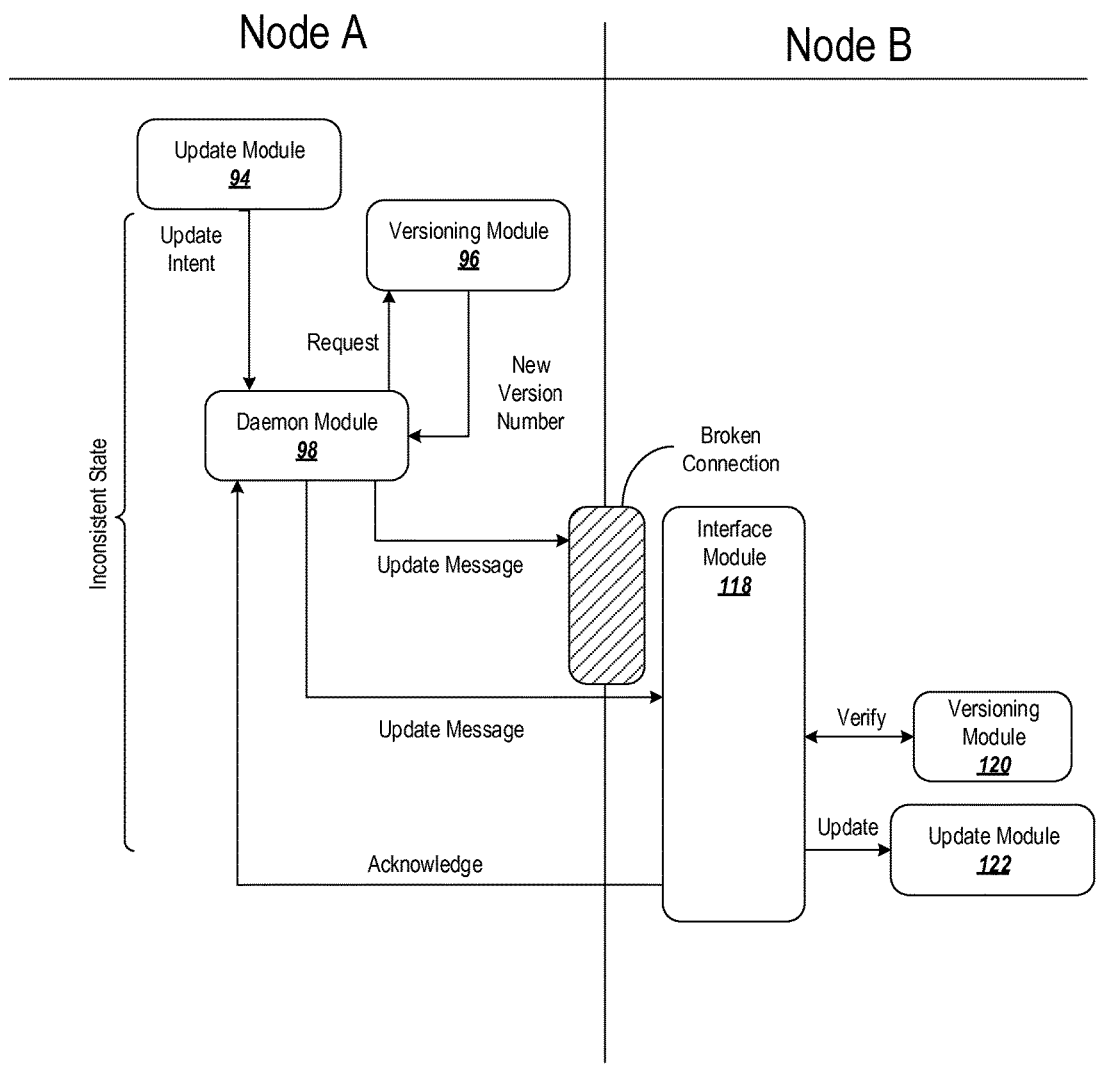
Figure 14C:
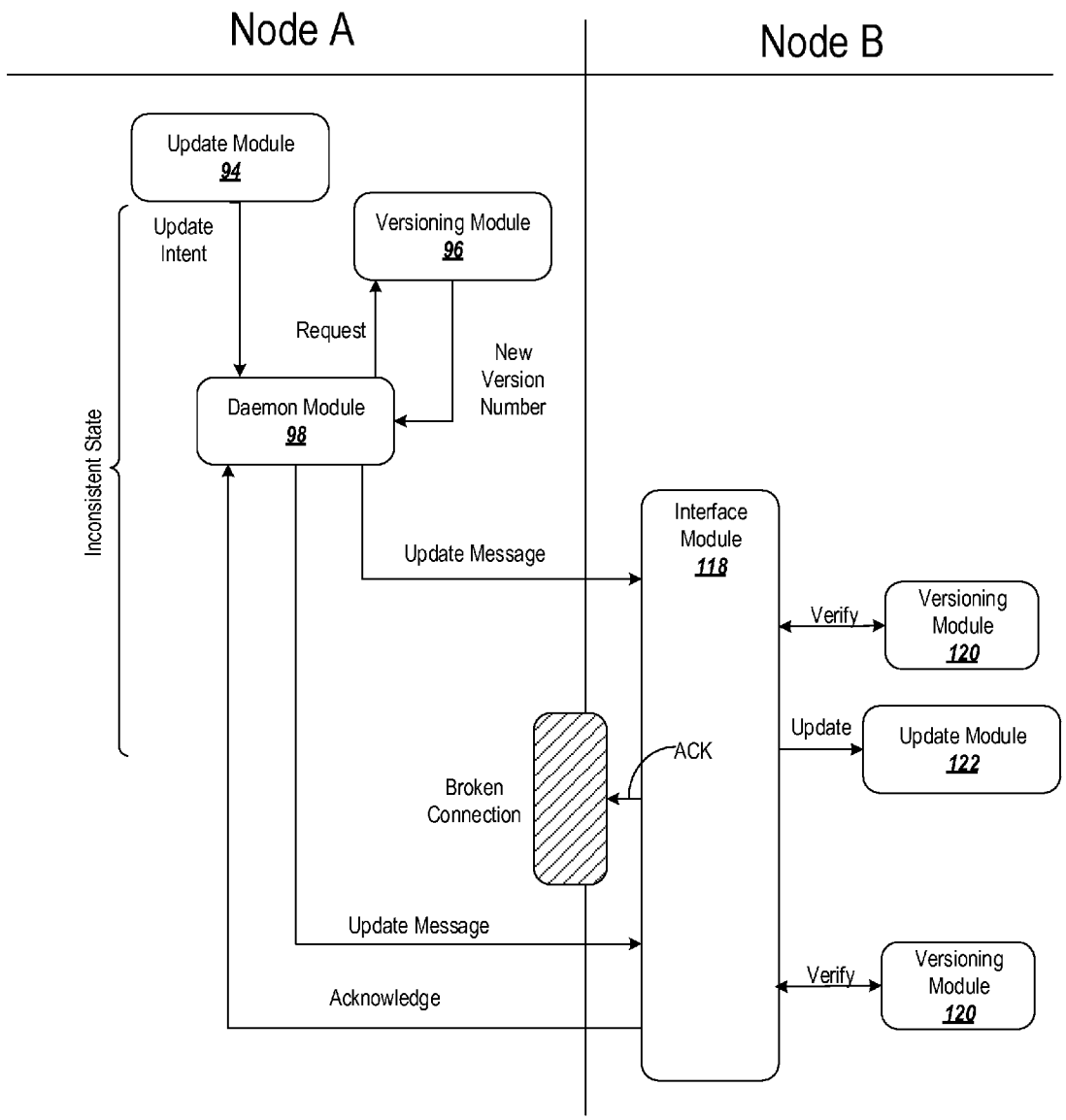

FIG. 14A-14C depict exemplary communications that occur when a master node issues a status update.

As shown in each of FIGS. 14A-14C, there is a period of time in which the entities are not consistent with each other (e.g., some entities have applied configuration updates and some entities have not). The time period generally corresponds to the time from when the update module 94 on the first node registers its intent to update the configuration and when the update module 122 on the second node updates that node's configuration. Nonetheless, using the exemplary techniques described herein, the entities can be brought into consistency eventually.

Computer-Related Embodiments

Figure 15:
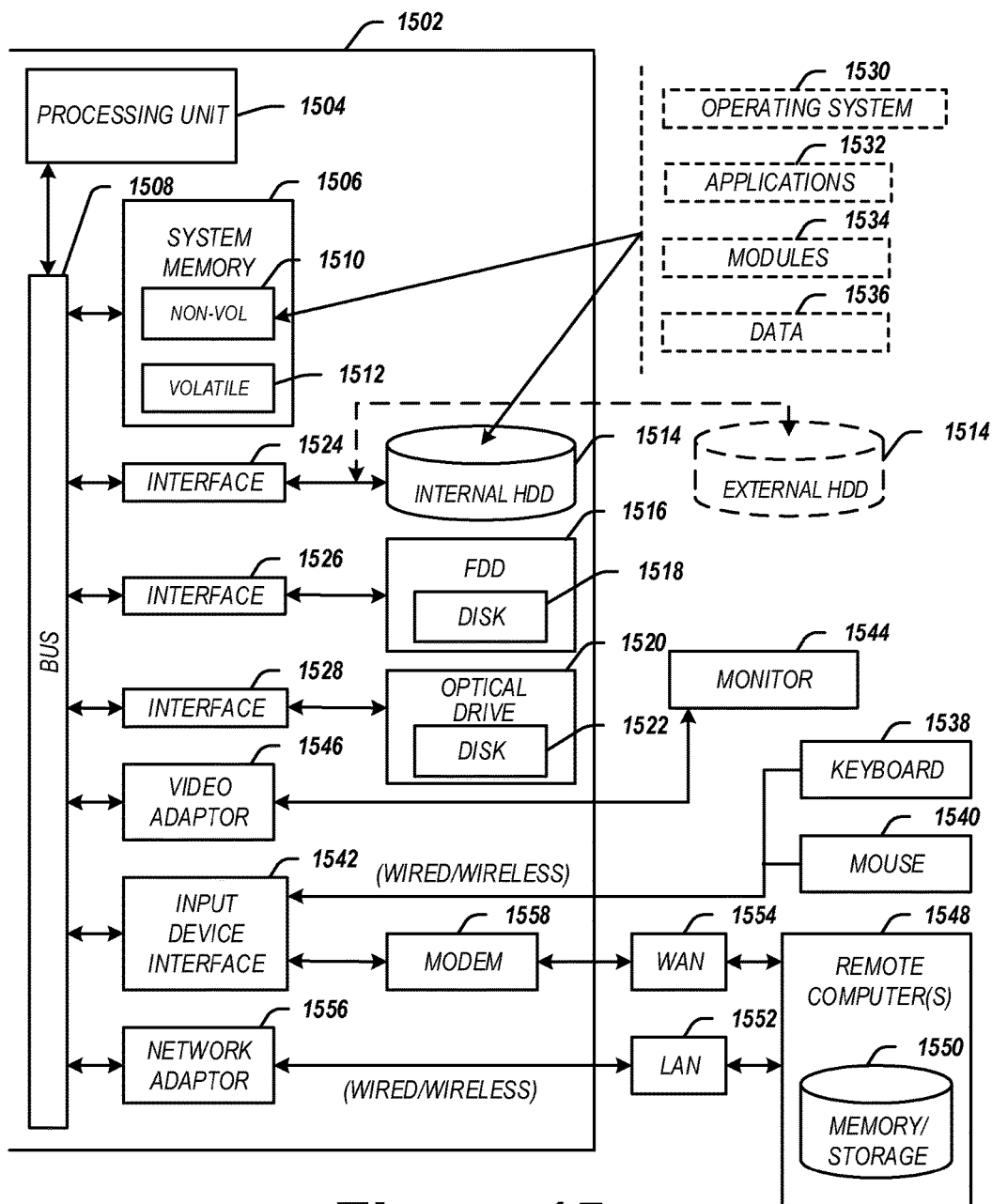
FIG. 15 depicts an exemplary computing device suitable for use with exemplary embodiments.

The above-described method may be embodied as instructions on a computer readable medium or as part of a computing architecture. FIG. 15 illustrates an embodiment of an exemplary computing architecture 1500 suitable for implementing various embodiments as previously described. In one embodiment, the computing architecture 1500 may comprise or be implemented as part of an electronic device. Examples of an electronic device may include those described with reference to FIG. 15, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the system 30.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 1542 that is coupled to the system bus 1508, but can be connected by other interfaces such as a parallel port, IEEE 694 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 1502 family of standards, such as wireless devices operatively disposed in wireless communication (e.g., IEEE 1502.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 1502.13x (a, b, g, n, etc.) to provide secure, reliable, fast wireless connectivity. A Wi-Fi network can be used to connect computers to each other, to the Internet, and to wire networks (which use IEEE 1502.3-related media and functions).

Figure 16:
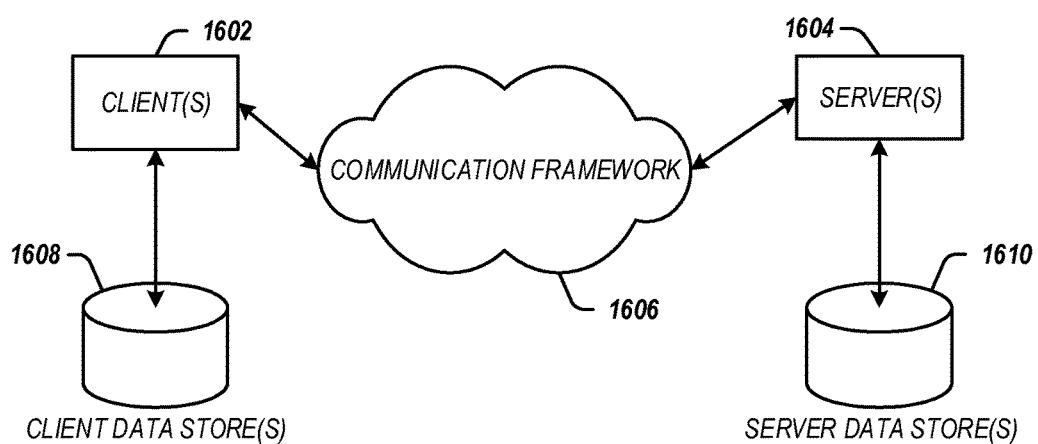
FIG. 16 depicts an exemplary network environment suitable for use with exemplary embodiments.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 comprises includes one or more clients 1602 and servers 1604. The clients 1602 may implement the client device 14 shown in FIG. 1. The servers 604 may implement the server device 104 shown in FIG. 1A. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 1502.11a-x network interfaces, IEEE 1502.16 network interfaces, IEEE 1502.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A non-transitory machine-readable medium having stored thereon instructions for facilitating configuration consistency comprising machine executable code which when executed by at least one machine, causes the machine to:
    receive a message including a mastership transaction that passes a master role from a retiring master entity to a destination entity receiving the message, wherein the retiring master entity and the destination entity are in a network; and
    determine when the mastership transaction is a new transaction based on a comparison of a sequence number received with the message to a stored sequence number corresponding to a last recorded mastership transaction and, when the determining indicates that the mastership transaction is a new transaction:
        update the stored sequence number;
        assume the master role including responsibility for configuring one or more other entities in the network; and
        send a reply to the received message to the retiring master to acknowledge that the master role has been assumed.

2. The medium of claim 1, wherein the machine executable code when executed by the machine, further causes the machine to:
    determine when the received sequence number is greater than the stored sequence number; and
    increment the stored sequence number, when the determining indicates that the received sequence number is greater than the stored sequence number.

3. The medium of claim 1, wherein the assuming mastership and updating the stored sequence number are performed together as an atomic transaction.

4. The medium of claim 1, wherein the transfer of mastership is idempotent.

5. The medium of claim 1, wherein the machine executable code when executed by the machine, further causes the machine to discard the message without updating the stored sequence number or acceding to the master role in response to the message, when the determining indicates that the mastership transaction is not a new transaction.

6. A method, comprising:
    receiving, by a computing device, a message including a mastership transaction that passes a master role from a retiring master entity to a destination entity, wherein the retiring master entity and the destination entity are in a network; and
    determining, by the computing device, when the mastership transaction is a new transaction based on a comparison of a sequence number received with the message to a stored sequence number corresponding to a last recorded mastership transaction and, when the determining indicates that the mastership transaction is a new transaction:
        updating, by the computing device, the stored sequence number;
        assuming, by the computing device, the master role including responsibility for configuring one or more other entities in the network; and
        sending, by the computing device, a reply to the received message to the retiring master to acknowledge that the master role has been assumed.

7. The method of claim 6, further comprising:
    determining, by the computing device, when the received sequence number is greater than the stored sequence number; and
    incrementing, by the computing device, the stored sequence number, when the determining indicates that the received sequence number is greater than the stored sequence number.

8. The method of claim 6, wherein the assuming mastership and updating the stored sequence number are performed together as an atomic transaction.

9. The method of claim 6, wherein the transfer of mastership is idempotent.

10. The method of claim 6, further comprising discarding, by the computing device, the message without updating the stored sequence number or acceding to the master role in response to the message, when the determining indicates that the mastership transaction is not a new transaction.

11. A computing device, comprising:
    a memory containing a machine readable medium comprising machine executable code having stored thereon instructions for facilitating configuration consistency; and
    a processor coupled to the memory, the processor configured to execute the machine executable code to cause the processor to:
        receive a message including a mastership transaction that passes a master role from a retiring master entity to a destination entity, wherein the retiring master entity and the destination entity are in a network; and
        determine when the mastership transaction is a new transaction based on a comparison of a sequence number received with the message to a stored sequence number corresponding to a last recorded mastership transaction and, when the determining indicates that the mastership transaction is a new transaction:
update the stored sequence number;
assume the master role including responsibility for configuring one or more other entities in the network; and
send a reply to the received message to the retiring master to acknowledge that the master role has been assumed.

12. The computing device of claim 11, wherein the processor is further configured to execute the machine executable code to cause the processor to:
determine when the received sequence number is greater than the stored sequence number; and
increment the stored sequence number, when the determining indicates that the received sequence number is greater than the stored sequence number.

13. The computing device of claim 11, wherein the assuming mastership and updating the stored sequence number are performed together as an atomic transaction.

14. The computing device of claim 11, wherein the transfer of mastership is idempotent.

15. The computing device of claim 11, wherein the processor is further configured to execute the machine executable code to cause the processor to discard the message without updating the stored sequence number or acceding to the master role in response to the message, when the determining indicates that the mastership transaction is not a new transaction.

* * * * *